UNITED STATES PATENT OFFICE.

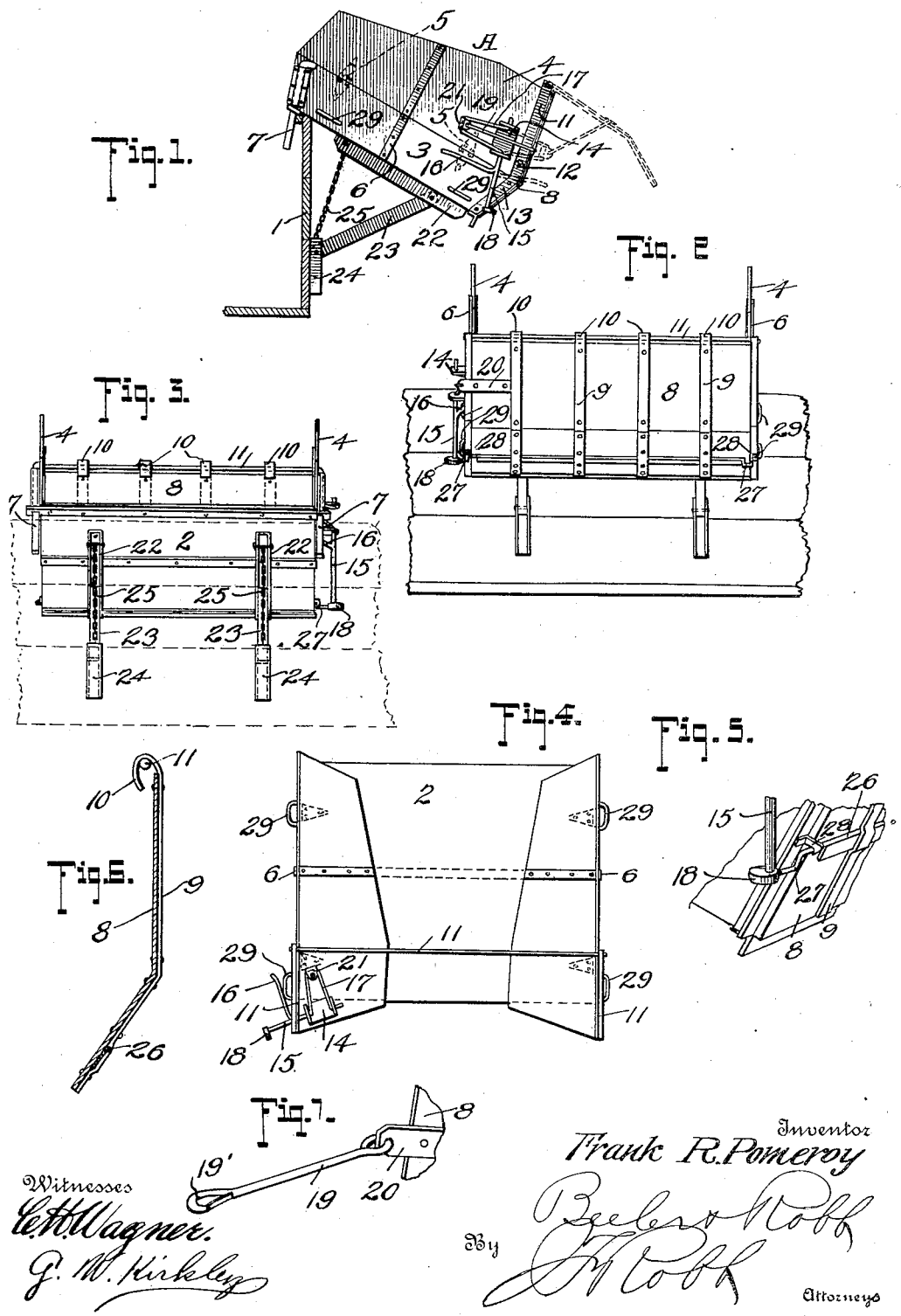

FRANK R. POMEROY, OF BIRMINGHAM, ALABAMA.

UNLOADING-CHUTE.

1,053,869.   Specification of Letters Patent.   Patented Feb. 18, 1913.

Application filed January 2, 1912. Serial No. 668,838.

*To all whom it may concern:*

Be it known that I, FRANK R. POMEROY, a citizen of the United States, residing at Birmingham, in the county of Jefferson and State of Alabama, have invented certain new and useful Improvements in Unloading-Chutes, of which the following is a specification.

This invention comprises an unloading chute especially adapted to be used in connection with freight cars for the purpose of facilitating the unloading of coal, sand, and similar contents of the car.

The unloading chute of this invention is provided with means at one end whereby said end may be detachably engaged over a side of a car, the opposite end of the chute having a dumping door which is operable by peculiar actuating means.

An especial feature of the invention resides in the mounting of the dumping door of the chute so that it may be readily detached to thereby decrease the weight of the chute body and permit of its being easily handled, as when moved from one car to another, or in mounting the chute upon a car.

A secondary feature of especial advantage is the construction of the chute whereby it is collapsible so as to occupy a comparatively small space when not in use, the collapsibility also facilitating the handling of the device in an obvious manner. Special locking means is also provided for the dumping door of the chute, and is operable by the means that actuates said door in opening same.

For a full understanding of the present invention, reference is to be had to the following description and to the accompanying drawings, in which—

Figure 1 is a side elevation of a chute embodying the invention, the same being shown in operative position in respect to the side portion of a car. Fig. 2 is a rear elevation of the chute with the door closed, the device being arranged on a car. Fig. 3 is a view of the chute looking from the end opposite that from which the view in Fig. 2 is taken, the side of the car being shown in dotted lines. Fig. 4 is a plan view of the device collapsed. Fig. 5 is a fragmentary perspective view bringing out more clearly the operating means for the lock rod. Fig. 6 is a sectional view showing more clearly the mounting of the door. Fig. 7 is a fragmentary view showing the actuating rod connected with the dumping door and its manner of attachment to said door.

Throughout the following detail description and on the several figures of the drawings, similar parts are referred to by like reference characters.

In the drawings, 1 denotes the side portion of a car to which the chute A is applied. Said chute comprises a bottom 2 and sides projecting upwardly from said bottom, each side being composed of a lower rigid section 3 and an upper folding section 4 hinged to the lower section as shown at 5. A reinforcing iron 6 extends around the chute A transversely thereof and is sectional in order to accommodate for the movement of the upper sections 4 of the sides, when the chute is collapsed.

At one end, the chute is open and provided at said end, upon the lower section 3 of each side, with a vertically movable engaging member or bolt 7, the advantage of the arrangement of which will be set forth hereinafter. At the opposite end of the chute is the detachable door 8 formed with reinforcing strips 9 on its outer surface, said strips projecting above the door and being bent to provide hooks 10. The hooks 10 engage over the transverse portion of a U-shaped bar 11, the sides of which are hinged at 12 to plates 13 applied to the adjacent extremities of the sections 3 of the chute sides.

One of the sides of the chute has a bracket 14 on its upper section 4 and in said bracket is mounted a rock shaft 15 having an operating arm 16, a crank 17 adjacent to its upper end, and an eccentric actuating disk 18 at its lower end. An actuating rod 19 is permanently but movably connected to an arm 20 on the dumping door 8, as shown in Fig. 7, and the other end of said rod has a snap hook 19' adapted to detachably engage a plate 21 affixed to the crank 17. On the under side of the bottom 2 of the chute are channel irons 22, adjacent to the lower ends of which are pivoted the braces 23. Each brace 23 has a shoe 24, preferably also of channeled material, pivoted thereto and flexible members 25 connect the parts 22 and 24 so as to limit the extent of relative movement of said parts, in the operation of placing the chute upon the car.

Guided by the strips 9 on the dumping door, and movable between said strips and said door, is a locking rod 26, one end of which is adapted to be engaged by the eccentric disk 18, so that the rod will be pushed longitudinally by said disk when the shaft 15 is operated to throw the dumping door open. The initial movement of the shaft moves the rod 26 until off-set portions 27 of said rod are opposite catches 28 on the sides of the chute, whereupon said catches become disengaged from the rod and release the door, the opening of which is accomplished by subsequent movement of the shaft 15. The opening movement of the door is shown by dotted lines in Fig. 1 and is, of course, caused by turning the shaft 15 through operation of the arm 16 and crank 17. The axis of the crank 17 being a short distance from the adjacent side of the chute A, normally, said crank inclines inwardly toward the chute. The initial movement of the crank carries the point of connection of the actuating rod 19 outward, not imparting a longitudinal or door opening movement to the rod. Said initial movement of the crank, through the disk 18, actuates the locking rod 26, and shortly after, the door is forcibly opened by the rod 19. When the door is permitted to close by operation of said shaft after the door has reached a closed position, the rod 26 will be manually operated to engage it again with the catches 28, though a spring might be used for the last mentioned purpose. By reason of the vertical arrangement of the bolts 7, it is apparent that when placing the chute on a car, said bolts may be upraised so as not to project from the bottom of the chute, thus rendering the extent of lifting movement of the chute less than if the bolts were permanently projected from the chute. Of course, when the upper end of the chute is once seated on the side of the car, the bolts 7 will be lowered to make the engagement secure. It will be apparent that the crank 17 when in its normal position, coöperates through the rod 19 to assist the hooks 28 in holding the door of the chute closed. Furthermore, when the door has reached the limit of its opening movement, as shown in dotted lines in Fig. 1, since the point of connection of the rod 19 with the crank 17 is beyond the "dead center," so to speak, in the direction of the chute, the door is supported in its open position by the crank and the rod 19. The crank 17 thus performs a dual function, being an actuating device for forcing the door open, and a means for maintaining the door in its position until the shaft 15 is actuated to return the crank to its normal position.

Handles 29 on the lower section of each side of the chute facilitate its portability. Of course, normally the door 8, by being arranged between the sides of the chute, prevent collapsing thereof but, after removing the door from the chute by disengaging the hooks 10 from the bar 11 and the hook 19' from the crank of the shaft 15, the upper sections 4 of the chute sides may be readily moved inward to the positions shown in Fig. 4, and the bar 11 moved downwardly thereon.

I do not wish to be limited to the exact form and arrangement of parts as hereinbefore described because the same may be modified in details in a manner readily apparent, and within the scope of the appended claims.

Having thus described the invention, what is claimed as new is:

1. An unloading chute for cars comprising a bottom and sides, a dumping door pivotally mounted on one end of the chute, locking mechanism for said door, operating means for the door comprising a shaft having a crank, means on the shaft to release the locking means of the door on initial movement of said shaft, a connection between the crank and the door whereby movement of the crank will actuate the door after release of the locking mechanism, and means for supporting the shaft and its crank on the chute so that when the door reaches the limit of its opening movement the crank will assume a position maintaining said door open.

2. An unloading chute for cars, or the like, comprising a bottom and sides, a bar extending transversely of the chute adjacent to one end, a dumping door detachably and pivotally mounted upon said bar, an operating shaft mounted on one side of the chute, an actuating rod connected with the door and detachably connected with the shaft for actuation by the latter, a locking rod mounted on the door, catches on the sides of the chute coacting with said rod, and means on the shaft for releasing the rod from said catches.

3. An unloading chute for cars comprising a bottom and sides, a dumping door at one end of the chute, an operating shaft mounted on the chute, means for turning said shaft, a crank carried by the shaft, a connection between the crank and door, and means supporting the shaft on the chute so that the crank aforesaid will forcibly open the door when the shaft is operated, said crank being adapted to abut with the chute when the door reaches its open position so as to support the door in its open position.

4. An unloading chute for cars comprising a bottom, sides composed of lower rigid sections and upper folding sections, a U-shaped bar at one end of the chute and pivotally connected to the lower sections of the sides so as to fold down upon the upper sections when the latter are folded, a dumping door normally detachably connected to said U-shaped bar and supported thereby at the adjacent end of the chute, and means for opening said door.

5. An unloading chute for cars comprising a bottom, sides composed of lower rigid sections and upper folding sections, a U-shaped bar at one end of the chute and pivotally connected to the lower sections of the sides so as to fold down upon the upper sections when the latter are folded, a dumping door normally detachably connected to said U-shaped bar and supported thereby at the adjacent end of the chute, and operating mechanism supported by the folding sections of one of the sides of the chute and having detachable connection with the door to permit removal of the latter from the chute.

6. An unloading chute for cars comprising sides and a bottom, the sides being composed of lower rigid sections and upper hinged sections adapted to fold down toward the bottom of the chute, a dumping door at one end of the chute, a supporting member for the dumping door to hold the latter in an operative position between the sides when the sections of the latter are operatively arranged for use, means detachably connecting the door with the supporting member, said supporting member being also adapted to fold downwardly toward the bottom of the chute when the latter is collapsed, and means for supporting the chute in operative position upon the side of a car.

7. An unloading chute for cars comprising sides and a bottom, the sides being composed of lower rigid sections and upper sections adapted to fold down toward the bottom, a dumping door at one end of the chute, means for supporting said door between the sides when the latter are in operative positions, locking means for normally holding the door closed, means on one of the folding side sections of the chute for releasing the locking means aforesaid, a rock shaft mounted on one of the folding side sections of the chute, means connecting said shaft with the door whereby to forcibly open the latter, means on said shaft for actuating the locking means in order to release the door, and means for supporting the chute in an operative position upon the side of a car.

8. An unloading chute for cars comprising sides and a bottom, a dumping door at one end of the chute, locking means for positively holding said door closed, operating means separate from the locking means for positively opening the door, means intermediate said operating means and the locking means whereby on initial movement of the operating means the door is unlocked and upon subsequent movement of the operating means the door is forcibly moved into an open position, and means for supporting the chute in an operative position upon a car.

In testimony whereof I affix my signature in presence of two witnesses.

FRANK R. POMEROY.

Witnesses:
 GEO. E. BUSH,
 D. N. FIKE.

---

Copies of this patent may be obtained for five cents each, by addressing the "Commissioner of Patents, Washington, D. C."